W. LUND.
Assignor to H. WYMAN.
WOOL COMBING MACHINE.
No. 10,930. Reissued May 15, 1888.
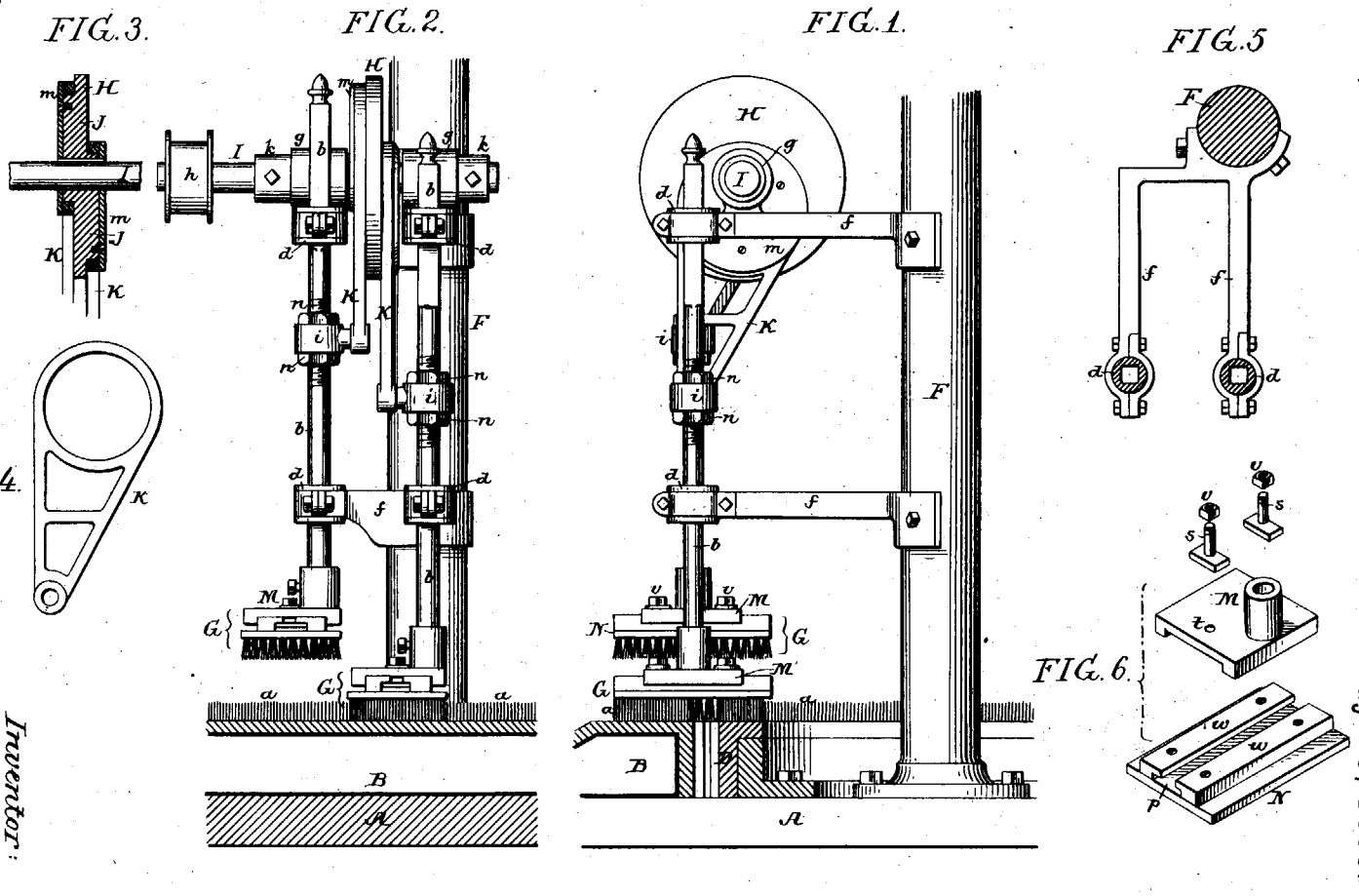
Witnesses:
David S. Williams.
John T. Lewis.
Inventor:
William Lund.
by his Attorneys.
Howson & Howson.
N. PETERS, Photo-Lithographer, Washington, D. C.

UNITED STATES PATENT OFFICE.

WILLIAM LUND, OF PHILADELPHIA, PENNSYLVANIA, ASSIGNOR TO HORACE WYMAN, OF WORCESTER, MASSACHUSETTS.

WOOL-COMBING MACHINE.

SPECIFICATION forming part of Reissued Letters Patent No. 10,930, dated May 15, 1888.

Original No. 355,186, dated December 28, 1886. Application for reissue filed April 16, 1888. Serial No. 270,863.

*To all whom it may concern:*

Be it known that I, WILLIAM LUND, a subject of the Queen of Great Britain and Ireland, and a resident of Philadelphia, Pennsylvania, have invented certain Improvements in Wool-Combing Machines, of which the following is a specification.

My invention consists of improvements in that class of wool-combing machines of which the Noble machine is an example, and in which the fiber to be combed is pressed into the teeth of revolving rings by means of a reciprocating dabbing-brush.

The objects of my invention are to equalize the wear upon the brush-reciprocating devices and to simplify and cheapen the construction of the same and of the brushes.

In the accompanying drawings, Figure 1 is a side view, partly in section, of sufficient of a wool-combing machine to illustrate my invention; Fig. 2, a front view partly in section; and Figs. 3, 4, 5, and 6, detached views of parts of the machine, illustrating features of construction.

A represents part of the fixed frame of the machine, B part of the hollow steam-heated ring, and D part of one of the inner rings of the machine, both of these rings having projecting teeth *a* upon the top, and the parts being otherwise constructed as usual in machines of this class.

Secured to the frame A is a column or standard, F, which carries the bearings for the brush-reciprocating devices.

The dabbing-brush is made in two sections, G G, each having a stem, *b*, and these stems are guided in sleeves or boxes *d* at the outer ends of upper and lower arms, *f*, the latter being secured to and projecting from the column or standard F. The upper arms *f* carry bearings *g* for the operating-shaft I, which has a pulley, *h*, for receiving a driving-belt from any suitable counter-shaft, said shaft I being retained in position longitudinally by means of collars *k*.

Keyed or otherwise secured to the shaft I is a disk, H, and secured to or forming part of this disk are two eccentrics, J J, set opposite to each other—that is to say, on opposite sides of the axis of the shaft—the strap K of one eccentric being connected to a collar, *i*, on the stem *b* of one of the brush-sections G, and the strap of the other eccentric being likewise connected to a similar collar on the stem of the other brush-section, so that as the shaft I is rotated a reciprocating movement will be imparted to both sections, one rising as the other descends.

Plates *m*, secured to the eccentrics, overlap the eccentric-straps K and prevent the accidental detaching of the same, and the collars *i* are confined between nuts *n* on the threaded portions of the stems *b*, whereby said stems and the brush-sections carried thereby can be adjusted vertically as desired.

In order to permit ready adjustment of the brush sections and their ready application to or removal from the operating-stems *b*, each of the latter carries at the lower end a grooved plate, M, for the reception of ribs *w* on the back of the brush-block N, these ribs forming an undercut slot, *p*, for the reception of the heads of bolts *s*, the stems of which are adapted to openings *t* in the plate M, and are threaded for the reception of nuts *v*.

The machine shown in the patent of J. H. Whitehead, No. 315,197, April 7, 1885, furnishes a good example of a construction which my invention is intended to replace. In said patented machine a long shaft extends across the machine from one column to another, and at each end of this shaft is an eccentric and mechanism for operating a single dabbing-brush, the eccentrics being set opposite to each other, so that one brush descends as the other rises. The brushes thus act alternately upon the wool at opposite sides of the machine; hence the strain comes first upon one end of the long operating-shaft and then upon the opposite end, thus tending to interfere with the steady driving of said shaft and to cause torsional strain, to counteract which the shaft must be made excessively heavy. In carrying out my invention, therefore, in place of single dabbing-brushes at each side of the machine, I use the dabbing-brush made in sections, acting alternately, as described, so that the strain upon each section is reduced to one-half of what it would be upon the whole brush, and brush-sections at each side of the machine are acting simultaneously.

Even if a single operating-shaft for the brushes at both sides of the machine were used therefor, the strain upon the opposite ends of said shaft would be equalized. For operating the brush-sections of my improved machine, however, the short shafts, each carried by bearings upon one of the pillars of the machine, and each having the operating-eccentrics centrally arranged thereon, as shown and described, are preferred, as such short shafts are more economical than the single long shaft, because their aggregate length is less, and because the two eccentrics form practically one structure, so that they cannot cause uneven strain on the shaft, which in consequence can be made lighter than the single long shaft. By my invention, also, I am enabled not only to equalize the wear of the parts which operate the brush-sections, but I am also enabled to cheapen the latter, as the small sections which I use are much less expensive than the single large brush heretofore employed. Moreover, when the first brush-section becomes worn it may be renewed without renewing the second brush-section; or the latter may take the place of the first and a new second section may be supplied. By "first brush-section" I mean that section which first acts upon the wool entering the machine, this being usually the right-hand section shown in the drawings.

It will be evident that crank-pins on the shaft I may be used in place of eccentrics, if desired; but the eccentrics are preferred.

I claim as my invention—

1. The combination of the toothed rings of a combing-machine with a dabbing-brush composed of sections working side by side and with means for reciprocating said sections, whereby they are caused to act alternately, all substantially as specified.

2. The combination of the column F of the machine, a dabbing-brush composed of sections located side by side, a short driving-shaft having bearings carried wholly by said column, eccentrics on said shaft, and mechanism, substantially as described, whereby the movement of said eccentrics is imparted to the sections of the dabbing-brush, all substantially as specified.

3. The combination of the dabbing-brush composed of sections located side by side, a driving-shaft, a pair of eccentrics forming a single structure, means for securing said structure to the shaft, and mechanism whereby the movement of the eccentrics is transmitted to the sections of the dabbing-brush, all substantially as specified.

4. The combination of the stem having a grooved plate at the lower end, the slotted brush-block having a portion adapted to said groove, and confining bolts and nuts whereby the brush-block is secured to the plate, all substantially as specified.

In testimony whereof I have signed my name to this specification in the presence of two subscribing witnesses.

WILLIAM LUND.

Witnesses:

EDWARD M. RILEY,
HARRY SMITH.